(12) United States Patent
Chang et al.

(10) Patent No.: US 11,169,626 B2
(45) Date of Patent: Nov. 9, 2021

(54) TRANSMITTER, TOUCH SENSITIVE PROCESSING APPARATUS AND PROCESSING METHOD THEREOF AND ELECTRONIC SYSTEM

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 0 days.

(21) Appl. No.: 17/137,472

(22) Filed: Dec. 30, 2020

(65) Prior Publication Data
US 2021/0200345 A1    Jul. 1, 2021

Related U.S. Application Data

(60) Provisional application No. 62/954,817, filed on Dec. 30, 2019.

(51) Int. Cl.
*G06F 3/0354*    (2013.01)

(52) U.S. Cl.
CPC .................. *G06F 3/03545* (2013.01)

(58) Field of Classification Search
CPC . G06F 3/03545; G06F 3/0416; G06F 3/04162
USPC ........................................................ 345/179
See application file for complete search history.

(56) References Cited

U.S. PATENT DOCUMENTS

2016/0306447 A1* 10/2016 Fleck .................... G06F 3/0414
2020/0401263 A1* 12/2020 Chung .................. G06F 1/1647

* cited by examiner

*Primary Examiner* — Mark Edwards
(74) *Attorney, Agent, or Firm* — WPAT, PC

(57) ABSTRACT

A transmitter processing method comprising: when in an all channel mode, do following steps: receiving beacon signals, transmitted by a touch panel, in multiple channels; and switching from the all channel mode to a single channel mode if the beacon signals are received in one channel of the multiple channels; and when in the single channel mode, do following steps: transmitting electrical signals in a time slot after the beacon signals are received; and receiving the beacon signals only in the one channel of the multiple channels.

21 Claims, 10 Drawing Sheets

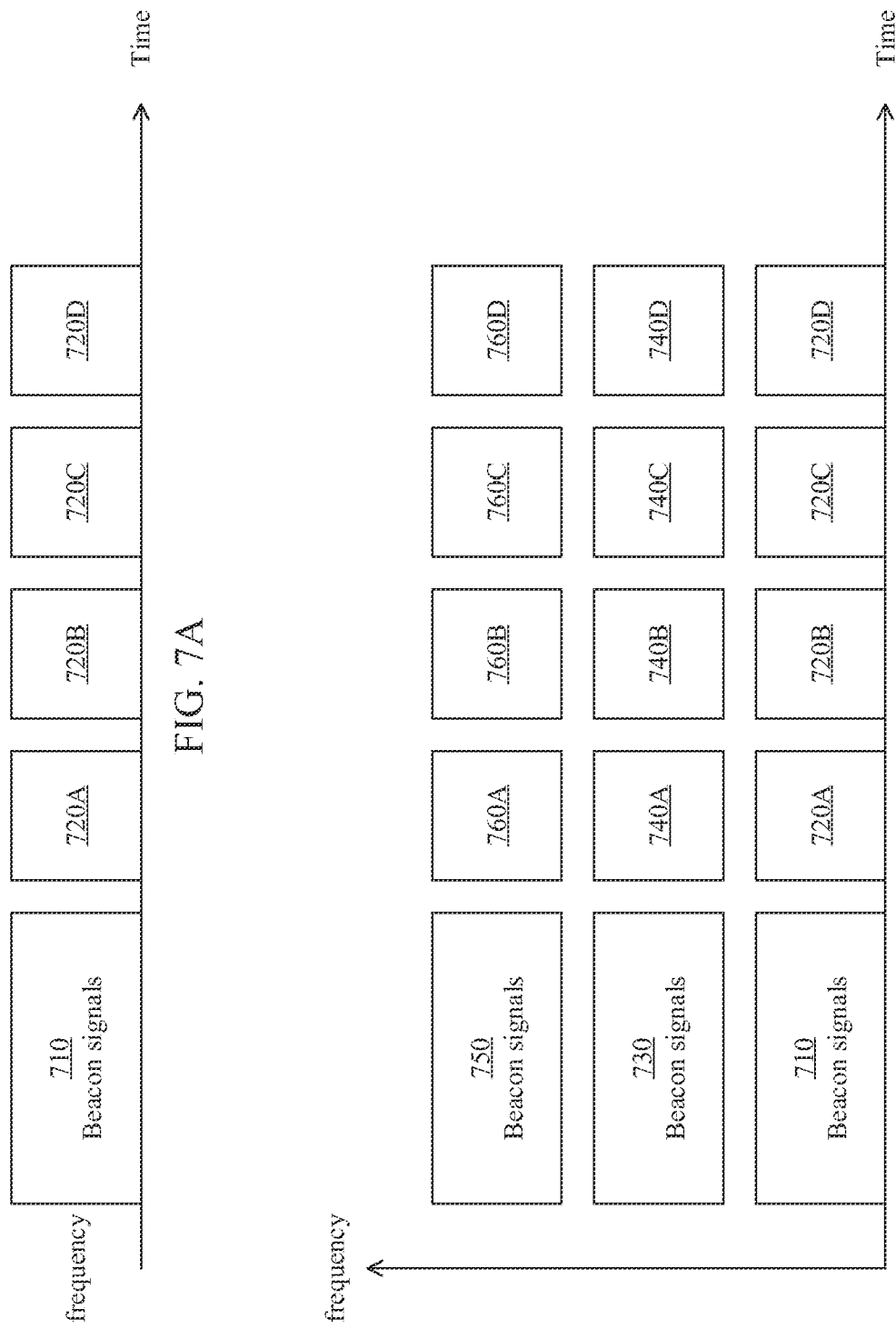

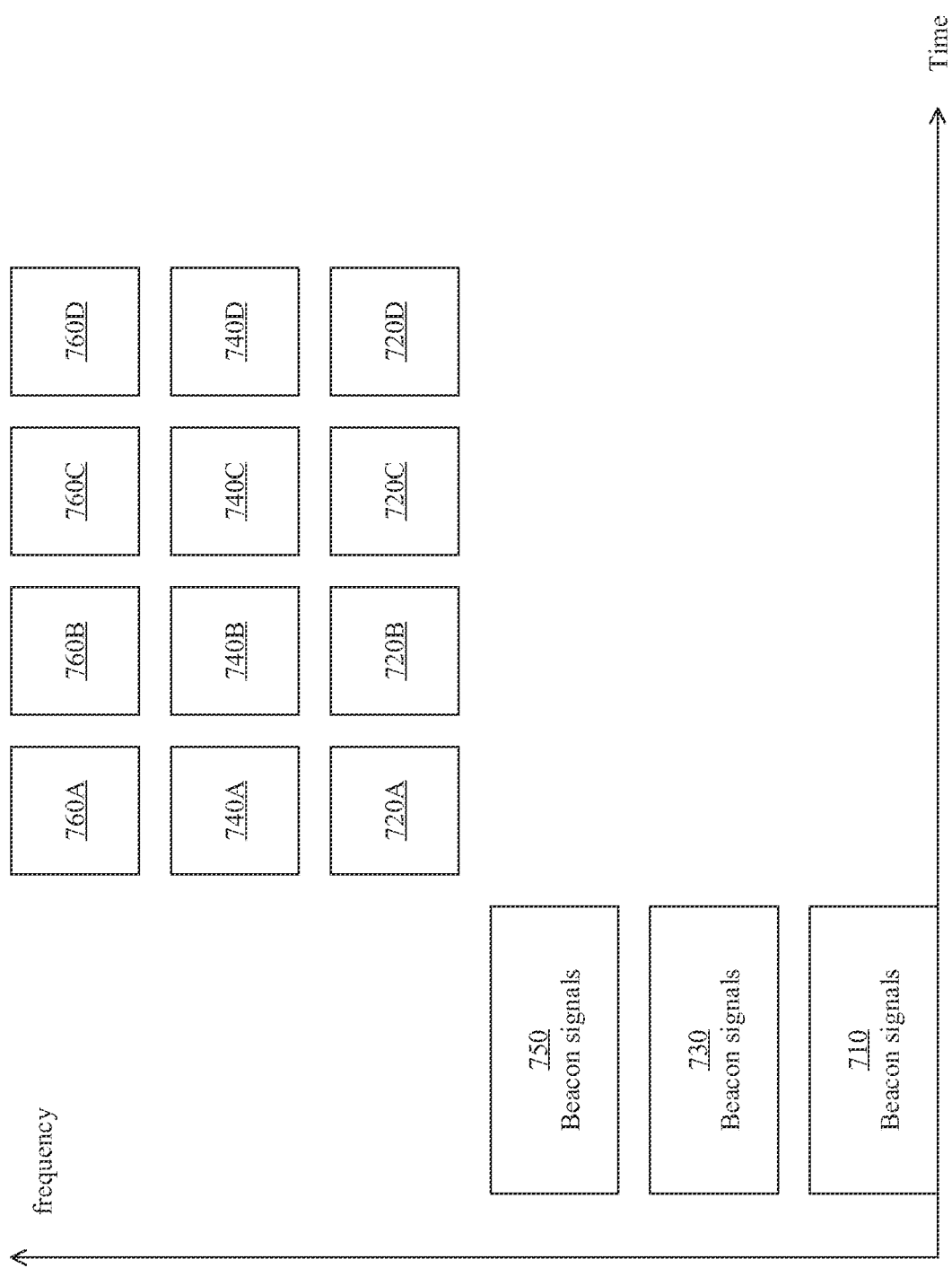

TRANSMITTER, TOUCH SENSITIVE PROCESSING APPARATUS AND PROCESSING METHOD THEREOF AND ELECTRONIC SYSTEM

CROSS REFERENCE TO RELATED PATENT APPLICATION

This patent application is based on a U.S. provisional patent application No. 62/954,817 filed on Dec. 30, 2019.

FIELD OF THE INVENTION

The present invention relates to touch system, and more particularly, to touch system including stylus.

BACKGROUND OF THE INVENTION

Existing active stylus and corresponding touch sensitive processing apparatus have to be paired. Only after being paired, the touch sensitive processing apparatus begins to report information of the paired stylus to a host. User may not always keep the active stylus close to touch panel enough to maintain wireless connection continuously. Once the active stylus leaves the touch panel for a while, the pairing relation would be expired. When the active stylus is taken back to the touch panel, it is required to execute another round of pairing procedure again.

In the pairing procedure, it usually takes three or more actions. No matter which one of the active stylus or the touch sensitive processing apparatus initiate a pairing message, it needs the counterpart to answer the pairing message. And the initiator has to send an acknowledgement message again to complete the pairing procedure. During the pairing, the touch sensitive processing apparatus would not report information corresponding to the stylus to the host. User cannot observe the input of the stylus from the reactions of the host.

The present application intends to solve how to reduce power and time consumption of the pairing procedure and speed up the first report corresponding to the stylus to the host by the touch sensitive processing apparatus.

SUMMARY OF THE INVENTION

The present application provides a touch system including transmitters such as styluses or electronic board erasers. After emitting beacon signals via a touch panel, a touch sensitive processing apparatus may detect multiple sets of electrical signals emitted by multiple transmitters in multiple predetermined time slots. And the touch sensitive apparatus may calculate report positions corresponding to the multiple styluses and information carried in the electrical signals to a host according to the multiple sets of electrical signals.

According to an aspect of the present invention. According to one aspect of the present invention, a transmitter is provided. The transmitter comprising: a receiving circuit, configured to receive beacon signals; a transmitting circuit, configured to transmit electrical signals to a touch panel which emits the beacon signals; and a processor, wherein when in an all channel mode, the processor is configured for: have the receiving circuit receives the beacon signals in multiple channels; and switching from the all channel mode to a single channel mode if the receiving circuit receives the beacon signals in one channel of the multiple channels; and wherein in the signal channel mode, the processor is configured for: have the transmitting circuit transmits the electrical signals in a time slot after the beacon signals are received; and have the receiving circuit receives the beacon signals only in the one channel of the multiple channels.

In one embodiment, in order to prevent conflict with another stylus with the same time slot setting, in the all channel mode, the processor is further configured for: when the receiving circuit receives the beacon signals, determining whether the beacon signals include information corresponding to the time slot is set; and when the information corresponding to the time slot is not set, performing said switching step.

In one embodiment, in order to let the transmitter to be functioned properly to another touch panel after leaving one touch panel, in the all channel mode, the processor is further configured for: resetting a counter after said switching step, wherein in the single channel mode, the processor is further configured for: determining whether the receiving circuit receives the beacon signals in the one channel; when the receiving circuit receives the beacon signals in the one channel, resetting the counter; when the receiving circuit does not receive the beacon signals in the one channel, increasing a value of the counter and determining whether the value of the counter is larger than a threshold; and when the value of the counter is larger than the threshold, switching from the single channel mode to the all channel mode.

In one embodiment, in order to change frequency of the electrical frequency by changing frequency of the beacon signals by the touch sensitive processing apparatus, wherein in the single channel mode, the processor is further configured for: determining whether the receiving circuit receives the beacon signals in the one channel; when the receiving circuit receives the beacon signals in the one channel, determining whether the beacon signals include a forget command corresponding to the transmitter; and when the beacon signals include the forget command, switching from the single channel mode to the all channel mode.

In one embodiment, in order to simplify designs of the transmitter and the touch sensitive processing apparatus, there is a correspondence between a frequency of the electrical signals and a frequency of the one channel, the correspondence and the time slot are predetermined.

In one embodiment, in order to let the transmitter receives the beacon signals and transmits the electrical signal when it is really approximating or touching the touch panel, the transmitters further comprises: an electrode; and a multiplexer, configured for connecting to the receiving circuit and the transmitting circuit in order to receive the beacon signals and to transmit the electrical signals, respectively, in a time-sharing manner.

According to an aspect of the present invention, a touch sensitive processing apparatus is provided. The touch sensitive processing apparatus comprising: a driving circuit, configured for transmitting beacon signals via multiple touch electrodes of a touch panel; a sensing circuit, configured for sensing electrical signals via the multiple touch electrodes; and a processor, coupled to the driving circuit and the sensing circuit, configured for: have the driving circuit transmits the beacon signals in one channel, wherein the beacon signals include a data section denoting information corresponding to multiple time slots of transmitters; in each of the time slots after the beacon signals are transmitted, respectively, determining whether a transmitter corresponding the current time slot transmits the electrical signals received by the multiple touch electrodes; and updating the data section denoting information corresponding to the multiple time slots according to the determination results in each of the time slots.

In one embodiment, in order to change frequency of the electrical frequency by changing frequency of the beacon signals by the touch sensitive processing apparatus, the processor is further configured for adding a forget command in the data section denoting information corresponding to multiple time slots of transmitters so as the transmitter corresponding to the forget command switches from a single channel mode to an all channel mode.

In one embodiment, in order to simplify designs of the transmitter and the touch sensitive processing apparatus, there is a correspondence between a frequency of the electrical signals and a frequency of the one channel, the correspondence and the time slots are predetermined.

In one embodiment, in order to reduce external electromagnetic interferences to the beacon signals for increasing chances of detecting the beacon signals by the transmitter, the beacon signals are modulated as DSSS (direct spread spectrum sequence) codes.

In on embodiment, in order to report a position of transmitter to the host even without being paired with the transmitter, the touch sensitive processing apparatus as claimed further comprises: a host interface, for connecting to the processor and a host, wherein the processor is further configured for: when it is determined that one or more transmitters corresponding one or more the time slots transmit the electrical signals, calculating one or more positions corresponding to the one or more transmitters on the touch panel, respectively; and have the host interface reports the one or more positions corresponding to the one or more transmitters to the host.

According to one aspect of the present invention, an electronic system is provided. The electronic system comprising: one or more the aforementioned touch sensitive processing apparatuses; one or more adjacent touch panels, respectively coupled to the one or more the touch sensitive processing apparatus; and a host, wherein each one of the touch sensitive processing apparatuses further comprises: a host interface, for connecting to the processor of the touch sensitive processing apparatus and the host, wherein the processor of the touch sensitive processing apparatus is further configured for: when it is determined that one or more transmitters corresponding one or more the time slots transmit the electrical signals, calculating one or more positions corresponding to the one or more transmitters on the touch panel, respectively; and have the host interface reports the one or more positions corresponding to the one or more transmitters to the host.

According to one aspect of the present invention, a transmitter processing method is provided. The transmitter processing method comprising: when in an all channel mode, do following steps: receiving beacon signals, transmitted by a touch panel, in multiple channels; and switching from the all channel mode to a single channel mode if the beacon signals are received in one channel of the multiple channels; and when in the single channel mode, do following steps: transmitting electrical signals in a time slot after the beacon signals are received; and receiving the beacon signals only in the one channel of the multiple channels.

In one embodiment, in order to prevent conflict with another stylus with the same time slot setting, in the all channel mode, the transmitter processing method further comprises: when the beacon signals are received, determining whether the beacon signals include information corresponding to the time slot is set; and when the information corresponding to the time slot is not set, performing said switching step.

In one embodiment, in order to let the transmitter to be functioned properly to another touch panel after leaving one touch panel, in the all channel mode, the transmitter processing method further comprises: resetting a counter after said switching step, wherein in the single channel mode, the transmitter processing method further comprises: determining whether the beacon signals in the one channel are received; when the beacon signals are received in the one channel, resetting the counter; when the beacon signals are not received in the one channel, increasing a value of the counter and determining whether the value of the counter is larger than a threshold; and when the value of the counter is larger than the threshold, switching from the single channel mode to the all channel mode.

In one embodiment, in order to change frequency of the electrical frequency by changing frequency of the beacon signals by the touch sensitive processing apparatus, in the single channel mode, the transmitter processing method further comprises: determining whether the beacon signals in the one channel are received; when the beacon signals are received in the one channel, determining whether the beacon signals include a forget command corresponding to the stylus; and when the beacon signals include the forget command, switching from the single channel mode to the all channel mode.

In one embodiment, in order to simplify designs of the transmitter and the touch sensitive processing apparatus, there is a correspondence between a frequency of the electrical signals and a frequency of the one channel, the correspondence and the time slot are predetermined.

In one embodiment, in order to let the transmitter receives the beacon signals and transmits the electrical signal when it is really approximating or touching the touch panel, the transmitter processing method further comprises: receiving the beacon signals and transmitting the electrical signals, respectively, via an electrode in a time-sharing manner.

According to an aspect of the present invention, a processing method applicable to a touch sensitive processing apparatus is provided. The processing method comprising: transmitting beacon signals via multiple touch electrodes of a touch panel, wherein the beacon signals include a data section denoting information corresponding to multiple time slots of transmitters; in each of the time slots after the beacon signals are transmitted, respectively, determining whether a transmitter corresponding the current time slot transmits electrical signals received by the multiple touch electrodes; and updating the data section denoting information corresponding to the multiple time slots according to the determination results in each of the time slots.

In one embodiment, in order to change frequency of the electrical frequency by changing frequency of the beacon signals by the touch sensitive processing apparatus, the processing method further comprises adding a forget command in the data section denoting information corresponding to multiple time slots of transmitters so as the transmitter corresponding to the forget command switches from a single channel mode to an all channel mode.

In one embodiment, in order to simplify designs of the transmitter and the touch sensitive processing apparatus, there is a correspondence between a frequency of the electrical signals and a frequency of the one channel, the correspondence and the multiple time slots are predetermined.

In one embodiment, in order to reduce external electromagnetic interferences to the beacon signals for increasing chances of detecting the beacon signals by the transmitter, the beacon signals are modulated as DSSS (direct spread spectrum sequence) codes.

In one embodiment, in order to report a position of transmitter to the host even without being paired with the transmitter, the processing method further comprises: when it is determined that one or more transmitters corresponding one or more the time slots transmit the electrical signals, calculating one or more positions corresponding to the one or more transmitters on the touch panel, respectively; and reporting the one or more positions corresponding to the one or more transmitters to a host.

According to an interaction mechanism between a transmitter and a touch sensitive processing apparatus provided by the present invention, the power and time consumption in the pairing procedure can be reduced and the first report to a host from the touch sensitive processing apparatus can be speed up.

BRIEF DESCRIPTION OF THE DRAWINGS

The advantages and spirit related to the present invention can be further understood via the following detailed description and drawings.

FIG. 7A is a diagram shows beacon signals and electrical signals in a time and frequency space in accordance with an embodiment of the present invention.

FIG. 7B is a diagram shows beacon signals and electrical signals in a time and frequency space in accordance with an embodiment of the present invention.

FIG. 7C is a diagram shows beacon signals and electrical signals in a time and frequency space in accordance with an embodiment of the present invention.

DETAILED DESCRIPTION OF THE PREFERRED EMBODIMENT

Figure 1:
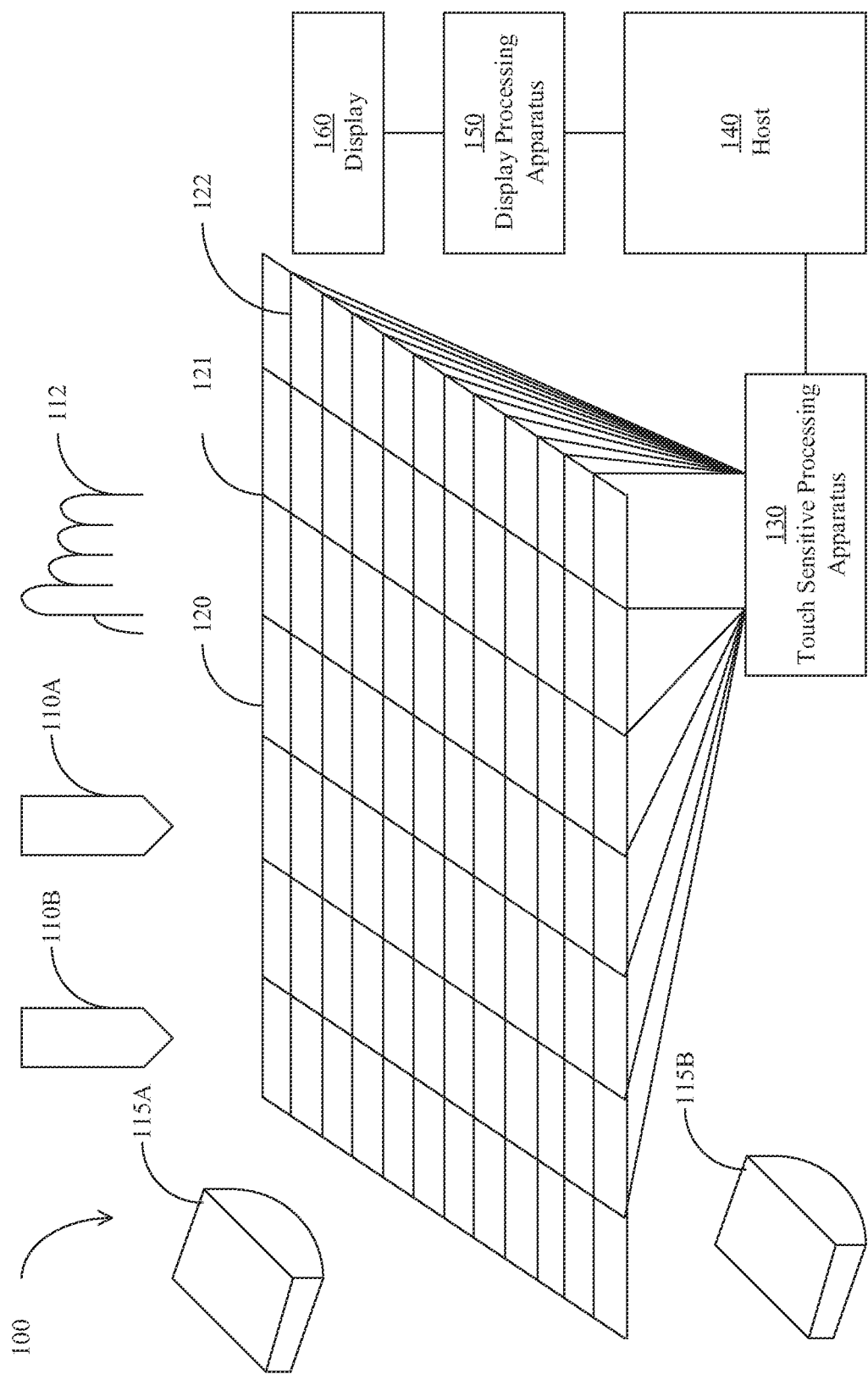
FIG. 1 is a block diagram depicts an electronic system 100 in accordance with an embodiment of the present application.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which is a block diagram depicts an electronic system 100 in accordance with an embodiment of the present application. The electronic system 100 includes a host 140, which includes devices for controlling operations of the electronic system 100 such as central processing unit, memory and interface for connecting peripheral input and output devices. The interface may include industrial standard interfaces such as PCI, PCI-E, SATA, ATA, USB, UART, etc. or proprietary interfaces. The host 140 connects to a display processing apparatus 150, which further connects to a display 160 for handling content shown by the display 160, via the interface. The host 140 connects to a touch sensitive processing apparatus 130 via the interface, too. The touch sensitive processing apparatus 130 further connects to a transparent touch panel 120 including multiple touch electrodes for detecting external conductive objects (such as hand 112), stylus 110A and stylus 110B, electronic board erasers 115A and 115B touching or approximating the touch panel. The transparent touch panel 120 comprises multiple first electrodes 121 in parallel to a first axis and multiple second electrodes 122 in parallel to a second axis. The transparent touch panel 120 may be arranged on the display 160. Or the transparent touch panel 120 can be integrated with liquid crystal display 160 as an embedded touch panel. The present application does not limit how the transparent touch panel 120 and the display integrate. In one embodiment, the touch panel 120 and the display 160 are collectively referred as a touch screen 120.

A central processing unit of the host 140 may execute instructions and data stored in a non-volatile memory for running operating system and application programs. The host 140 and the display processing apparatus 150 may individually or jointly control the display content of the display 160 or the touch screen 120 according to the instructions of the operating system and application programs. In this present invention, the host 140 controls the display content in general. When the host 140 executes some programs, the touch screen 120 shows a drawing area. When the stylus 110A or 110B inputs in the drawing area, the drawing area shows strokes corresponding to the stylus 110A or 110B. The display content in the stroke area would be changed according to the inputs of the stylus 110A or 110B. Analogously, when the electronic board erasers 115A or 115B inputs in the drawing area, the drawing area shows an erasing area corresponding to the electronic board eraser 115A or 115B. The display content in the erasing area would be changed according to the inputs of the electronic board eraser 115A or 115B.

Figure 2:
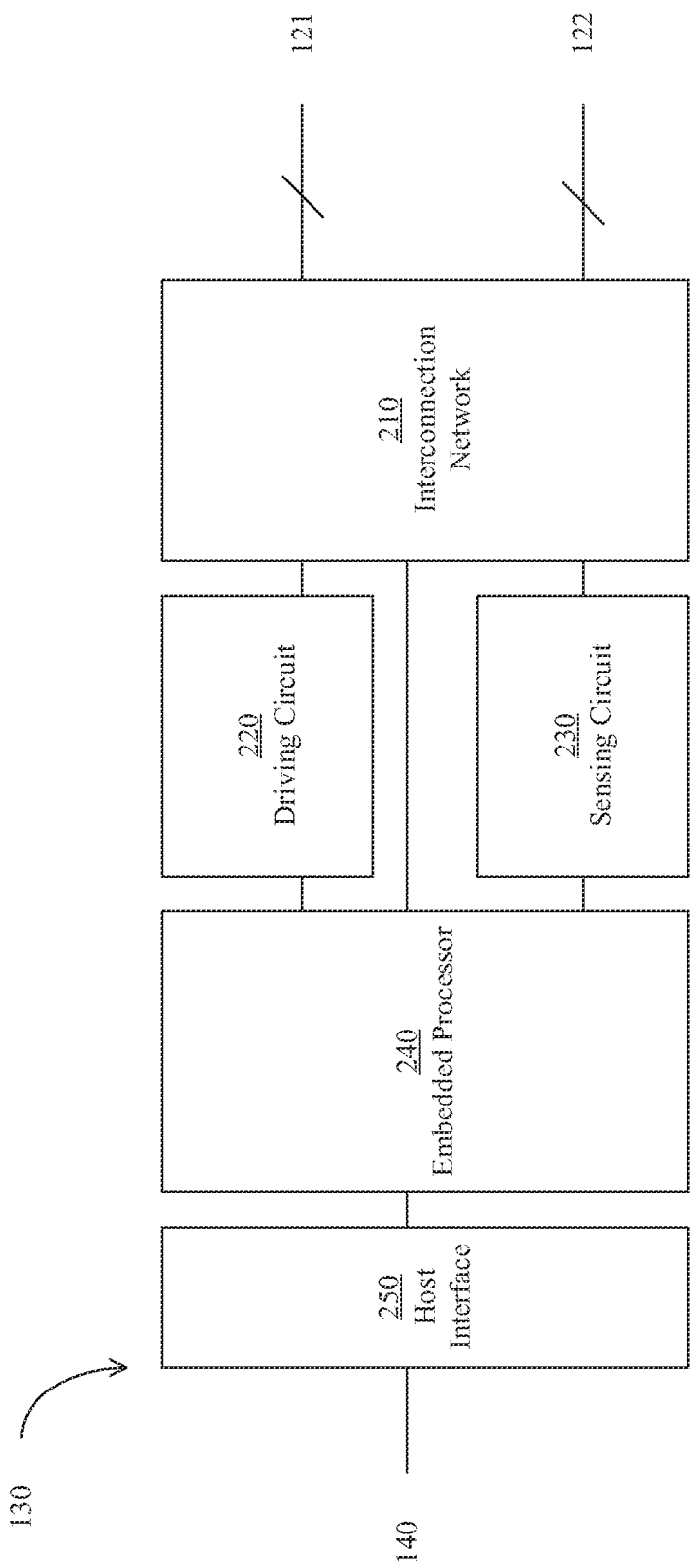
FIG. 2 shows a block diagram of a touch sensitive processing apparatus 130 in accordance with an embodiment of the present invention.

Please refer to FIG. 2, which shows a block diagram of a touch sensitive processing apparatus 130 in accordance with an embodiment of the present invention. The touch sensitive processing apparatus 130 comprises an embedded processor 240 which is arranged to connect and to control an interconnection network 210, a driving circuit 220, a sensing circuit 230 and a host interface 250. The driving circuit 220 may connect each of the first electrodes 121 and each of the second electrodes via the interconnection network 210 for emitting driving signals via these electrodes concurrently or in a time-sharing manner. The sensing circuit 230 may connect each of the first electrodes 121 and each of the second electrodes via the interconnection network 210 for sensing signals via these electrodes concurrently or in a time-sharing manner. The embedded processor 240 may communicate with the host 140 via the host interface 250. The embedded processor 240 may execute program modules stored in non-volatile memory for detecting the aforementioned approximating objects and events.

Figure 3:
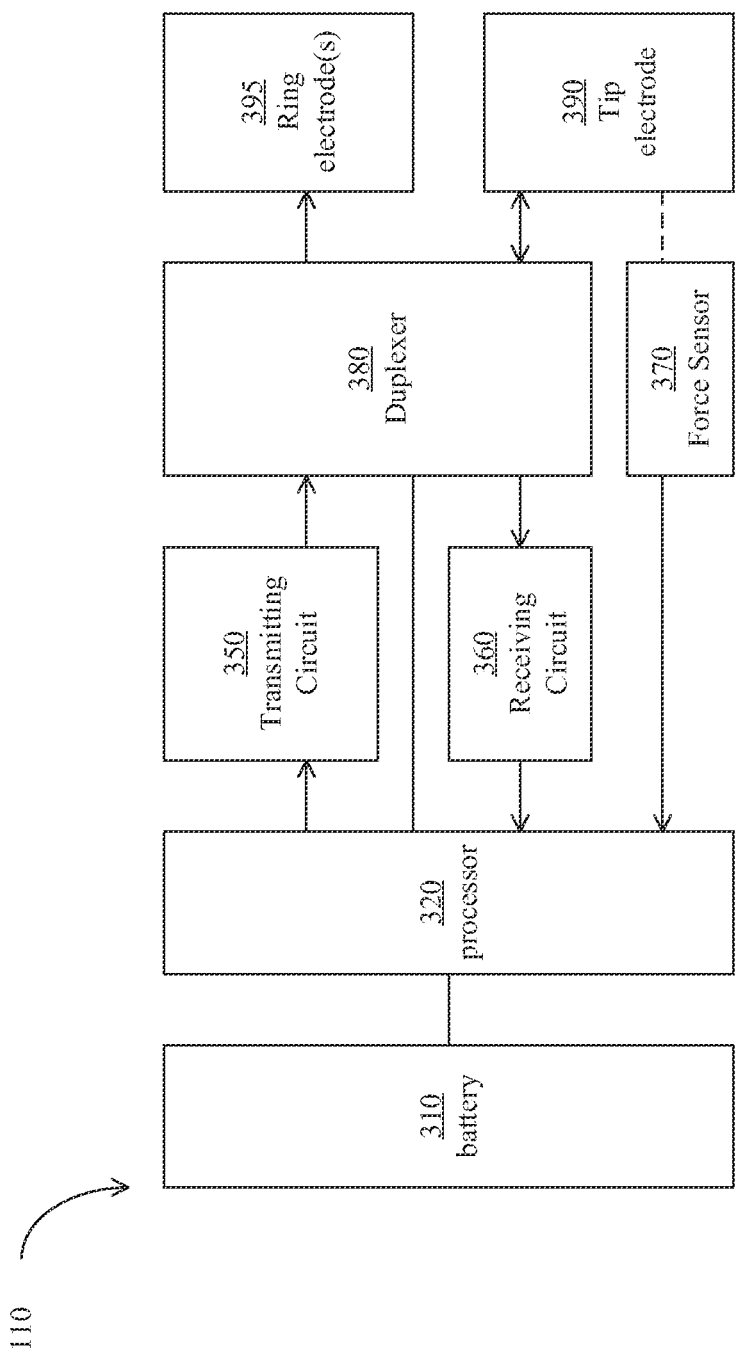
FIG. 3 shows a block diagram of a stylus 110 according to an embodiment of the present invention.

Please refer to FIG. 3, which shows a block diagram of a stylus 110 according to an embodiment of the present invention. The stylus 110 may comprises a power module which may include a battery or a capacitance for supplying power to the stylus 110. One end of the stylus 110 may include a tip electrode 390. There may be at least one ring electrode 395 surrounding the tip electrode 390. The tip electrode 390 and the ring electrode 395 may emit electrical signals simultaneously or in a time-sharing manner. The touch sensitive processing apparatus 130 may detect the electrical signals via the first electrodes 121 and the second electrodes 122 of the touch panel 120 and may calculate a position of the tip electrode of the stylus 110 and a position of the ring electrode of the stylus 110. Moreover, based on the positions of the tip electrode and the ring electrode, an axis direction of the stylus 110 projected to the touch panel 120 can be calculated; and a tilt angle between the stylus 110 and the touch panel 120 can be calculated.

The stylus 110 may include a multiplexer 380, a receiving circuit 360, a transmitting circuit 350 and a processor 320. The multiplexer 380 may connect to the tip electrode 390 and the ring electrode 395. The touch sensitive processing apparatus 130 may transmit beacon signals to the stylus 110 via the first electrodes 121 and the second electrodes 122 of the touch panel 120. When the stylus 110 receives the beacon signals, the multiplexer 380 is configured to connect to the tip electrode 390. The receiving circuit 360 may receive the beacon signals via the multiplexer 380 and the tip electrode 390. After receiving the beacon signals, the receiving circuit 360 may notify the processor 320 for subsequent processing.

When the stylus 110 transmits electrical signals, the multiplexer 380 is configured to connect the tip electrode 390 and/or the ring electrode 395. The transmitting circuit 350 may transmit the electrical signals to the touch panel 120 through the tip electrode 390 and the ring electrode 395 concurrently or in a time-sharing manner. The stylus 110 may further comprises a force sensor 370 connecting to the tip electrode 390 for sensing pressure on the tip. The pressure value sensed by the force sensor 370 may send to the processor 320. The processor 320 may modulate the electrical signals according to the pressure value so as the touch sensitive processing apparatus 130 may calculate the sensed pressure value according to the modulated electrical signals.

Although the force sensor 370 as shown in FIG. 3 senses pressure in digital form, the present invention may utilize the mechanism, disclosed in U.S. Pat. No. 9,581,816 and its continuation and continuation-in-part applications, where the force sensor is used to directly modulate the electrical signals to be outputted.

Figure 4:
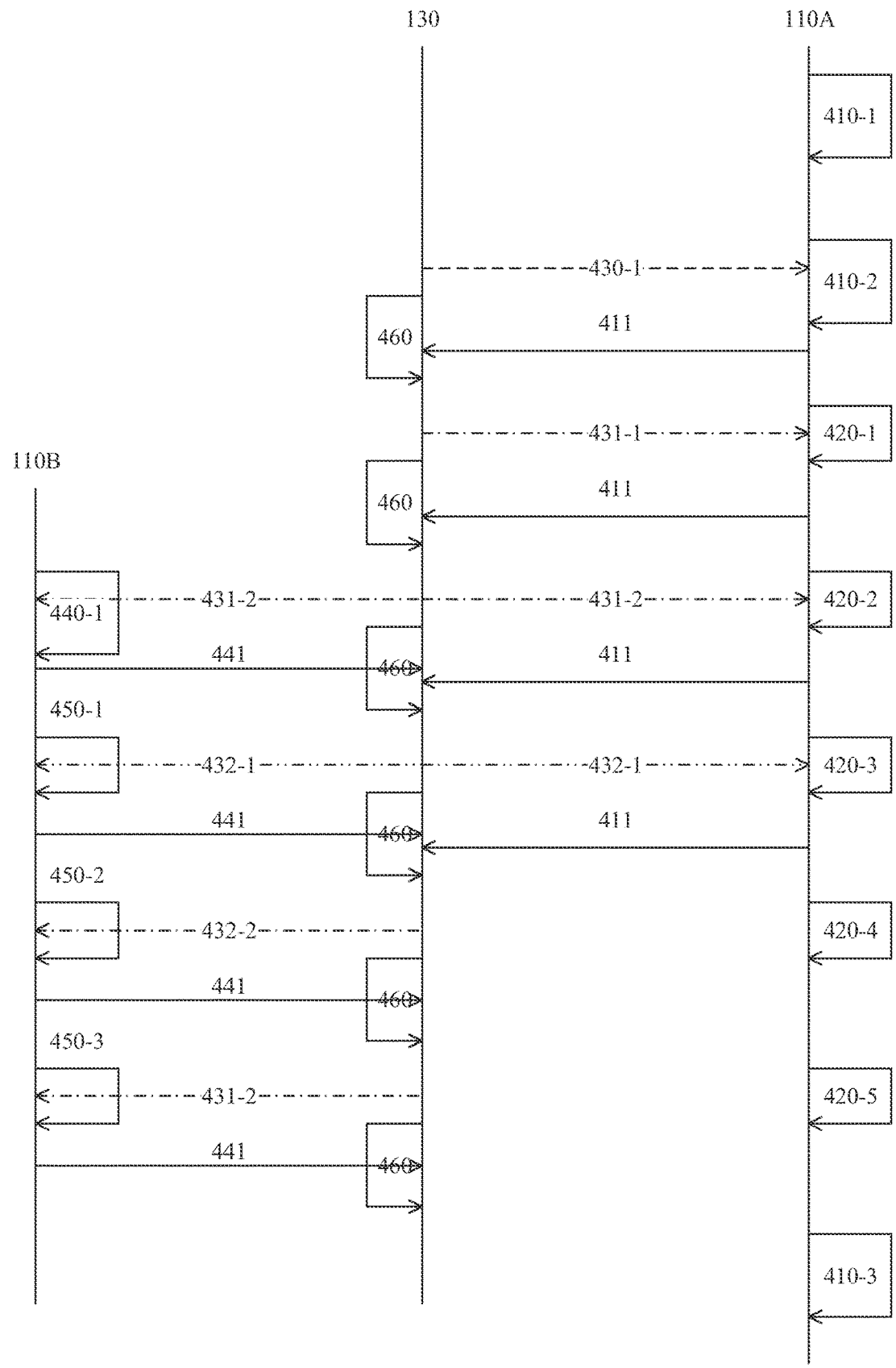
FIG. 4 shows an interaction chart of styluses and a touch sensitive processing apparatus in accordance with an embodiment of the present invention.

Please refer to FIG. 4, which shows an interaction chart of styluses and a touch sensitive processing apparatus in accordance with an embodiment of the present invention. As shown in FIG. 4, two styluses 110A and 110B interact with a touch sensitive processing apparatus. At the beginning, the stylus 110A performs a detection step 410-1 for detecting beacon signals. Because the touch sensitive processing apparatus 130 may transmit beacon signals carried in multiple frequencies simultaneously or in a time-sharing manner, the detection step 410-1 may detect the beacon signals carried in multiple frequencies simultaneously or in a time-sharing manner.

The beacon signals may be DSSS (Direct Spread Spectrum Sequence) modulated signals carried in one or more carrier frequencies. The beacon signals may comprise preamble code and data section for denoting the stylus states currently received by the touch sensitive processing apparatus 130. For example, the electronic system 100 may include N styluses, where N is a natural number which is larger than or equals to 2. The data section may include information corresponding to the N styluses 110. Information corresponding to each stylus may include whether the electrical signals corresponding to the stylus is received or not.

When the second detection step 410-1 is performed on multiple frequencies by the stylus 110A, the stylus 110A successfully detects beacon signals 430-1 because the stylus 110A comes closer to the touch panel. Because the touch sensitive processing apparatus 130 does not receive any electrical signals at the moment, the data section in the beacon signals denotes that no electrical signal from any stylus is received.

Since the stylus 110A detects the beacon signals 430-1 at the second detection step 410-1, the stylus 110A transmits electrical signals 411 via at least the tip electrode 390 during a predetermined time slot. In one embodiment, as described above, the stylus 110A transmits electrical signals to the touch panel 120 via the tip electrode 390 and the ring electrode 395 simultaneously or in a time-sharing manner during the predetermined time period. And the touch sensitive processing apparatus 130 detects the electrical signals 411. Subsequently, the touch sensitive processing apparatus 130 denotes that it received the electrical signals corresponding to the stylus 110A in the data section of the next beacon signals 431-1.

Besides, because the stylus 110A detects the beacon signals 430-1 at the second detection step 410-1, the stylus 110A only needs to detect beacon signals at the third detection step 420-1 on the carrier frequency of the previous detected beacon signals. It does not need to detect N carrier frequencies. The stylus 110A can still detect the beacon signal 431-1 and is aware that the data section in the beacon signals denoting that the touch sensitive processing apparatus 130 already receives the electrical signals transmitted from the stylus 110A.

Next, when the touch sensitive processing apparatus 130 transmits beacon signals 431-2, the stylus 110B detects the beacon signals 431-2 at a detection step 440-1 on multiple carrier frequencies. Hence, the stylus 110B transmits electrical signals 441 at least through the tip electrode 390 in another predetermined time slot.

As shown in FIG. 4, the predetermined time slot for the stylus 110B transmitting electrical signals is earlier than the predetermined time slot for the stylus 110A. Therefore, the touch sensitive processing apparatus 130 is able to detect two sets of electrical signals from the styluses 110A and 110B. Subsequently, the touch sensitive processing apparatus 130 transmits beacon signals 432-1 which denotes that two sets of electrical signals from the styluses 110A and 110B are received. The detection step 450-1, performed by the stylus 110B, can detect on the carrier frequency of the previous beacon signals. The stylus 110B is aware that the data section in the beacon signals 432-1 denotes that the touch sensitive processing apparatus 130 already received the electrical signals transmitted by the stylus 110B.

At the detection step 420-4 step, the stylus 110A still detects beacon signals on only one carrier frequency. However, since the stylus 110A is taken away from the touch panel 120, the stylus 110A is unable to receive beacon signals. Hence, the stylus 110A does not transmit electrical signals. Next, the stylus 110A still detects beacon signals on only one carrier frequency at the detection step 420-5. Since the stylus 110A is far away from the touch panel 120, the stylus 110A is unable to receive beacon signals. Hence, the stylus 110A does not transmit electrical signals. Because it detects no beacon signals on the single carrier frequency twice, the stylus 110A detects beacon signals on N carrier frequencies at the next detection step 410-3.

Figure 5:
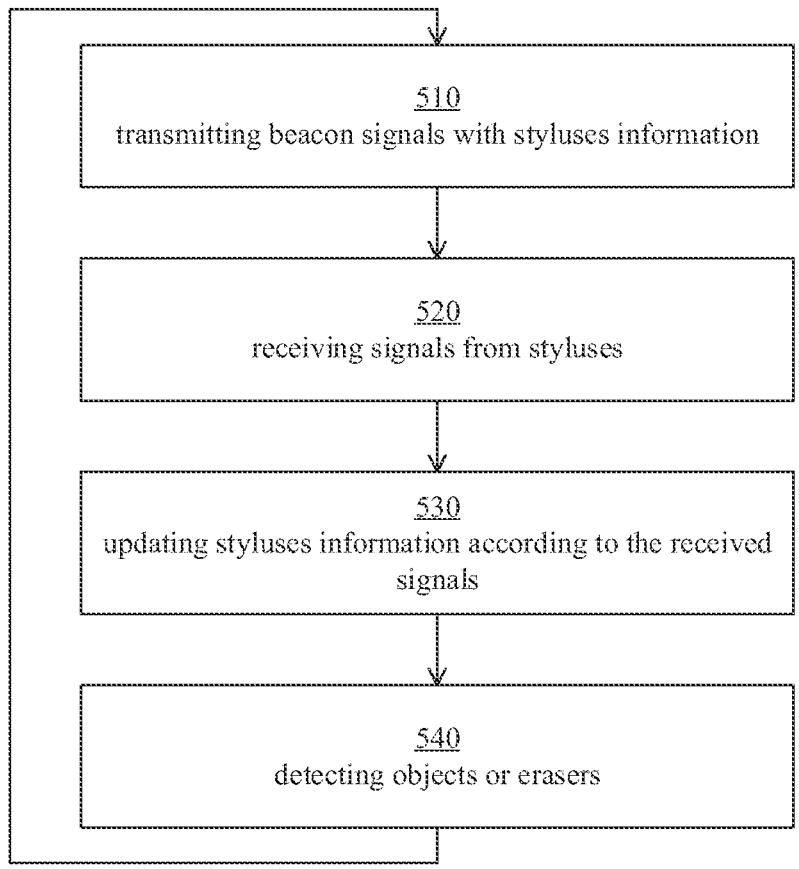
FIG. 5 depicts a flowchart diagram of a touch sensitive processing method 500 in accordance with an embodiment of the present invention.

Please refer to FIG. 5, which depicts a flowchart diagram of a touch sensitive processing method 500 in accordance with an embodiment of the present invention. The touch sensitive processing method 500 is applicable to the touch sensitive processing apparatus 130, especially to the embedded processor 240.

Step 510: transmitting beacon signals and a data section denotes information related to styluses. In one embodiment, the beacon signals are transmitted in single carrier frequency or in N carrier frequencies.

Step 520: receiving electrical signals transmitted from the stylus 110 via the touch panel 120. In one embodiment, a position of a tip electrode of the stylus and a position of a ring electrode of the stylus can be determined according to the received electrical signals. An axis direction of the stylus 110 projected to the touch panel 120 can be calculated, and a tilt angle between the stylus 110 and the touch panel 120 can be calculated.

Step 530: updating information related to styluses in the data section according to the received electrical signals.

Optional step 540: detecting external conductive object or touch board eraser. At last, the flow goes back to the step 510.

Figure 6:
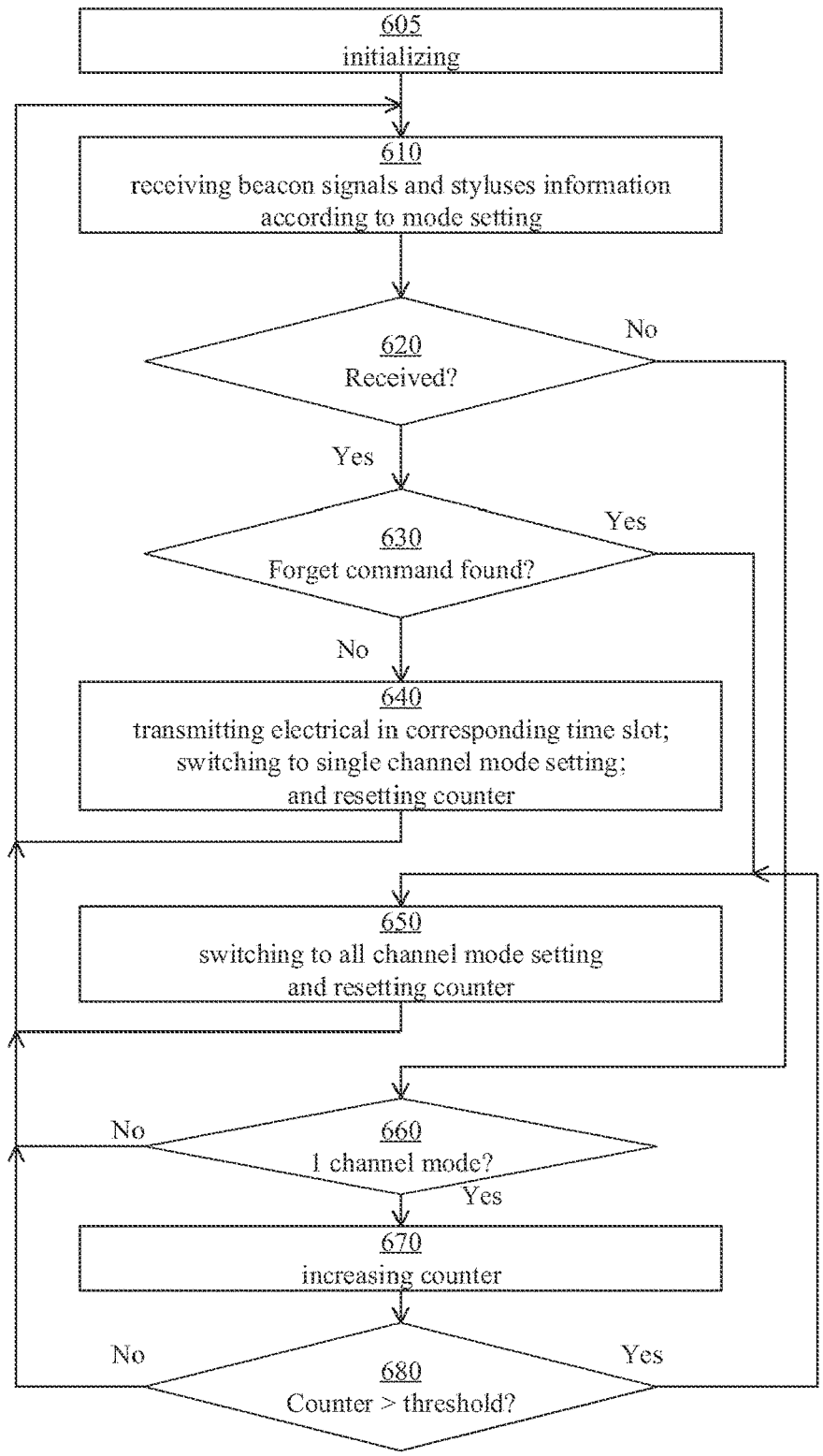
FIG. 6 depicts a flowchart diagram of a stylus processing method 600 in accordance with an embodiment of the present invention.

Please refer to FIG. 6, which depicts a flowchart diagram of a stylus processing method 600 in accordance with an embodiment of the present invention. The stylus processing method 600 is applicable to the stylus 110, especially applicable to the processor 320.

Step 605: initializing parameters, including a counter and a channel mode for detecting beacon signals. The counter can be initialized to zero and the channel mode can be initialized to an all channel mode. In one embodiment, each channel can be corresponding to one carrier frequency. In other embodiments, channel may be corresponding to another modulation factors.

Step 610: based on the channel mode, receiving beacon signals and data section denoting information corresponding to styluses.

Step 620: determining whether the beacon signals and the data section denoting information corresponding to styluses are received. If they are received, the flow may goes to the optional step 630 or directly goes to the step 640. If no beacon signals are received, the flow goes to the step 660.

Optional step 630: in one embodiment, the touch sensitive processing apparatus 130 may command the styluses to forget the beacon signal channel by denoting information related to the styluses in the data section. At this step 630, determining whether a forget command is received or not. When the forget command is received, the flow goes to the step 650; otherwise, the flow goes to the step 640.

Step 640: transmitting electrical signals in a corresponding time slot; switching to a single channel mode; and resetting the counter. Then the flow returns back to the step 610.

Step 650: switching to the all channel mode and resetting the counter. Then the flow returns back to the step 610.

Step 660: determining whether it is in the single channel mode. If it is in the single channel mode, the flow goes to the step 670; otherwise, the flow returns back to the step 610.

Step 670: increasing the value of the counter.

Step 680: determining whether the value of the counter is larger than a threshold. If it is larger than the threshold, the flow goes to the step 650; otherwise, the flow goes to the step 610.

Please refer to FIG. 7A, which is a diagram shows beacon signals and electrical signals in a time and frequency space in accordance with an embodiment of the present invention. In this embodiment, the touch sensitive processing apparatus 130 may transmit beacon signals in only one carrier frequency. And the electronic system 100 may have four styluses operating concurrently which transmit four electrical signals 720A, 720B, 720C and 720D in four time slots, respectively. In a variant, the stylus 110 may transmit electrical signals in one or more frequencies corresponding to the carrier frequency. In one variant, there is turn-around time period between the time slots.

Please refer to FIG. 7B, which is a diagram shows beacon signals and electrical signals in a time and frequency space in accordance with an embodiment of the present invention. In this embodiment, the touch sensitive processing apparatus 130 may transmit beacon signals in multiple carrier frequencies. In the embodiment as shown in FIG. 7B, it includes beacon signals 710, 730 and 750 in three carrier frequencies. A first stylus 110 may transmit electrical signals 720A, 740A and 760A in one or more frequencies in a first electrical signal time slot according to its received carrier frequency. A second stylus 110 may transmit electrical signals 720B, 740B and 760B in one or more frequencies in a second electrical signal time slot according to its received carrier frequency. The third and the fourth stylus do similar actions.

Please refer to FIG. 7C, which is a diagram shows beacon signals and electrical signals in a time and frequency space in accordance with an embodiment of the present invention. Comparing with the embodiment as shown in FIG. 7B, the frequency of electrical signals is not identical to the carrier frequency of its corresponding beacon signals in the embodiment as shown in FIG. 7C. For example, the electrical signals 720A modulated in one or more frequencies which are not identical to the carrier frequency of the corresponding beacon signals 710.

Figure 8:
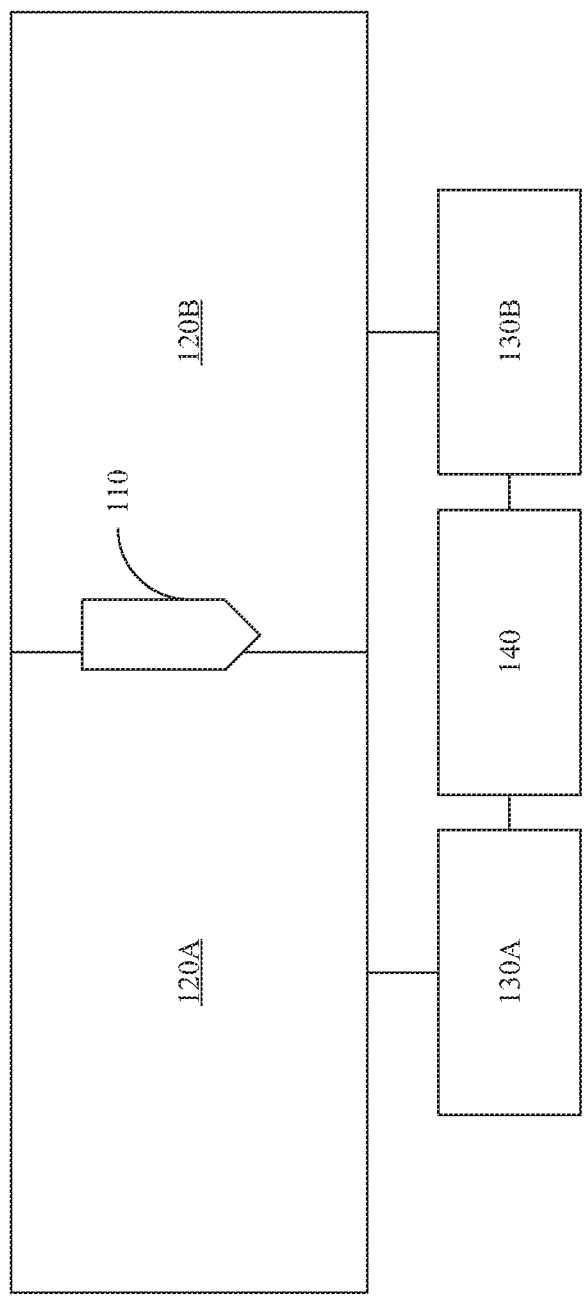
FIG. 8 is a block diagram of an electronic system 800 in accordance with another embodiment of the present invention.

Please refer to FIG. 8, which is a block diagram of an electronic system 800 in accordance with another embodiment of the present invention. Comparing with the electronic system 100, the electronic system 800 includes two adjacent touch panels 120A and 120B which connects to the touch sensitive processing apparatuses 130A and 130B, respectively. These two touch sensitive processing apparatuses 130A and 130B also connects to the host 140 for reporting touch events on the touch panels 120A and 120B, respectively. However, there is no direct communication between these two touch sensitive processing apparatuses 130A and 130B. Hence, they cannot perform synchronization for transmitting beacon signals.

When a stylus 110 is located around the junction of the two touch panels 120A and 120B, the tip electrode 390 may receive beacon signals transmitted from the two touch panels 120A and 120B. In one embodiment, the host 140 may command the touch sensitive processing apparatuses 130A and 130B for transmitting beacon signals in different frequencies. For example, it may command the touch sensitive processing apparatuses 130A and 130B for transmitting beacon signals 710 and 730, respectively.

When the stylus 110 approaches the touch panel 120A at the beginning, it may try to detect the beacon signals 710, 730 and 750. Since the touch sensitive processing apparatus 130A transmits the beacon signal 710 via the touch panel 120A, the stylus 110 does not try to detect the beacon signals 730 and 750 after the beacon signal 710 is detected. The stylus 110 switches into a single channel mode and transmits one of the electrical signals 720A, 720B, 720C and 720D corresponding to the beacon signal 710. For convenience, it is assumed that the stylus 110 transmits the electrical signal 720A.

Even when the stylus 110 locates around the junction between the two touch panels 120A and 120B, the tip electrode 390 may receive the beacon signals 710 and 730 transmitted from the two touch panels 120A and 120B. However, since the stylus 110 does not try to detect the beacon signal 730, it does not transmit any one of the electrical signals 740A, 740B, 740C and 740C corresponding to the beacon signal 730. Because the stylus 110 locates around the junction between the two touch panels 120A and 120B, the touch sensitive processing apparatuses 130A and 130B may detect the electrical signals 720A. Because the electrical signals 720A are corresponding to the beacon signal 710, hence the touch sensitive processing apparatus 130A accepts the electrical signals 720A. And because the electrical signals 720A are not corresponding to the beacon signal 730, the touch sensitive processing apparatus 130B does not process the electrical signals 720A.

In other words, according to the mechanism provided by the present application, the touch sensitive processing apparatuses 130A and 130B do not redundantly report touch events corresponding to the stylus 110 to the host 140. In the aforementioned example, only the touch sensitive processing apparatus 130A reports the touch events corresponding to the stylus 110.

Moreover, when the stylus 110 leaves the touch panel 110A to the touch panel 110B, since the touch sensitive processing apparatus 130A does not receive the electrical signal 720A, it may denote a forget command in the data section of the beacon signal 710 to request the stylus 110 to forget the beacon signal channel. Thus, the stylus 110 switches to the all channel mode for detecting the beacon signals 710, 730 and 750. Alternatively, when the stylus 110 detects none of the beacon signal 710 continuously, it switches to the all channel mode for detecting the beacon signals 710, 730 and 750.

Next, the stylus 110 detects the beacon signal 730 in the all channel mode and switches to the single channel mode consequently. Then the stylus 110 transmits one of the electrical signals 740A, 740B, 740C and 740D corresponding to the beacon signal 730. It is assumed to be the electrical signal 740A. Even when the touch sensitive processing apparatus 130A detects the electrical signal 740A, the touch sensitive processing apparatus 130A does not process the electrical signal 740A which is not corresponding to the beacon signal 710.

In other words, according to the mechanism provided by the present application, the touch sensitive processing apparatuses 130A and 130B do not report touch events corresponding to the stylus 110 to the host 140 redundantly. In the aforementioned example, only the touch sensitive processing apparatus 130B reports the touch events corresponding to the stylus 110.

Figure 9:
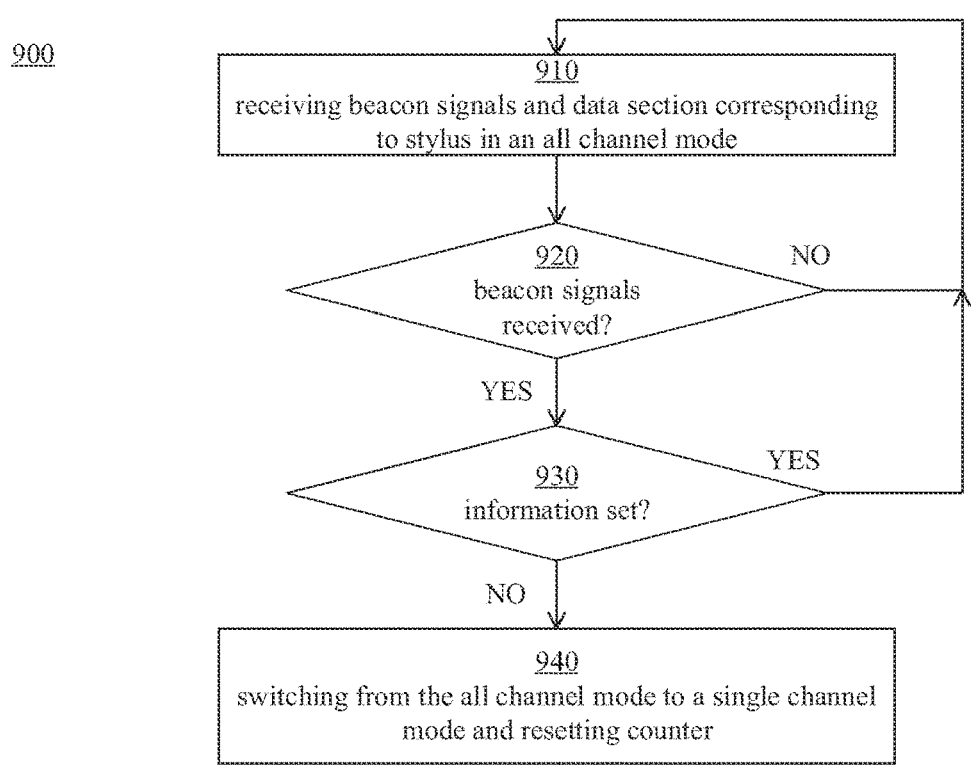
FIG. 9 is a flowchart diagram of a stylus processing method 900 according to an embodiment of the present invention.

Please refer to FIG. 9 which is a flowchart diagram of a stylus processing method 900 according to an embodiment of the present invention. The stylus processing method 900 is applicable to the stylus 110, especially applicable to the processor 320. The stylus processing method 900 is used to prevent two styluses with the same time slot setting transmitting electrical signals to a touch panel concurrently. In an all channel mode, the stylus may determine whether the beacon signal contains information corresponding to the time slot of the stylus is denoted. If the beacon signal contains information corresponding to the time slot of the stylus is already denoted, it implies that another stylus with the same time slot setting is already paired with the touch sensitive processing apparatus. Hence, the late comer should not transmit electrical signals in the same time slot in order to prevent confusion.

Step 910: receiving beacon signals and data section corresponding to stylus in an all channel mode.

Step 920: determining whether the beacon signals is received. If not received, the flow goes back to the step 910; otherwise, the flow goes to the step 930.

Step 930: determining whether information corresponding to a time slot of the stylus is set. If the information is set, the flow goes back to the step 910; otherwise, the flow goes to the step 940.

Step 940: switching from the all channel mode to a single channel mode and resetting counter. The steps executed in the signal channel mode are already described in the embodiment as shown in FIG. 6.

In summarized, the embodiments provided by the present application can simplify the pairing procedure in prior art to reduce power and time consumption in the pairing procedure and speed up the first report corresponding to the stylus to the host by the touch sensitive processing apparatus.

Besides, the stylus can detect beacon signals carried in multiple channels. Hence it can be used on multiple touch panels which are adjacent or not. Especially, an electronic system may include a large touch screen which is consisted of two or more touch panels and corresponding touch sensitive processing apparatuses. In accordance with the embodiments provided by the present application, one stylus can be used on the touch screen seamlessly.

Moreover, the stylus may be switched to detect beacon signal carried in one single channel to save power consumptions for detecting beacon signals carried in multiple channels.

According to one aspect of the present invention, a transmitter is provided. The transmitter comprising: a receiving circuit, configured to receive beacon signals; a transmitting circuit, configured to transmit electrical signals to a touch panel which emits the beacon signals; and a processor, wherein when in an all channel mode, the processor is configured for: have the receiving circuit receives the beacon signals in multiple channels; and switching from the all channel mode to a single channel mode if the receiving circuit receives the beacon signals in one channel of the multiple channels; and wherein in the signal channel mode, the processor is configured for: have the transmitting circuit transmits the electrical signals in a time slot after the beacon signals are received; and have the receiving circuit receives the beacon signals only in the one channel of the multiple channels.

In one embodiment, in order to prevent conflict with another stylus with the same time slot setting, in the all channel mode, the processor is further configured for: when the receiving circuit receives the beacon signals, determining whether the beacon signals include information corresponding to the time slot is set; and when the information corresponding to the time slot is not set, performing said switching step.

In one embodiment, in order to let the transmitter to be functioned properly to another touch panel after leaving one touch panel, in the all channel mode, the processor is further configured for: resetting a counter after said switching step, wherein in the single channel mode, the processor is further configured for: determining whether the receiving circuit receives the beacon signals in the one channel; when the receiving circuit receives the beacon signals in the one channel, resetting the counter; when the receiving circuit does not receive the beacon signals in the one channel, increasing a value of the counter and determining whether the value of the counter is larger than a threshold; and when the value of the counter is larger than the threshold, switching from the single channel mode to the all channel mode.

In one embodiment, in order to change frequency of the electrical frequency by changing frequency of the beacon signals by the touch sensitive processing apparatus, wherein in the single channel mode, the processor is further configured for: determining whether the receiving circuit receives the beacon signals in the one channel; when the receiving circuit receives the beacon signals in the one channel, determining whether the beacon signals include a forget command corresponding to the transmitter; and when the beacon signals include the forget command, switching from the single channel mode to the all channel mode.

In one embodiment, in order to simplify designs of the transmitter and the touch sensitive processing apparatus, there is a correspondence between a frequency of the electrical signals and a frequency of the one channel, the correspondence and the time slot are predetermined.

In one embodiment, in order to let the transmitter receives the beacon signals and transmits the electrical signal when it is really approximating or touching the touch panel, the transmitters further comprises: an electrode; and a multiplexer, configured for connecting to the receiving circuit and the transmitting circuit in order to receive the beacon signals and to transmit the electrical signals, respectively, in a time-sharing manner.

According to an aspect of the present invention, a touch sensitive processing apparatus is provided. The touch sensitive processing apparatus comprising: a driving circuit, configured for transmitting beacon signals via multiple touch electrodes of a touch panel; a sensing circuit, configured for sensing electrical signals via the multiple touch electrodes; and a processor, coupled to the driving circuit and the sensing circuit, configured for: have the driving circuit transmits the beacon signals in one channel, wherein the beacon signals include a data section denoting information corresponding to multiple time slots of transmitters; in each of the time slots after the beacon signals are transmitted, respectively, determining whether a transmitter corresponding the current time slot transmits the electrical signals received by the multiple touch electrodes; and updating the data section denoting information corresponding to the multiple time slots according to the determination results in each of the time slots.

In one embodiment, in order to change frequency of the electrical frequency by changing frequency of the beacon signals by the touch sensitive processing apparatus, the processor is further configured for adding a forget command in the data section denoting information corresponding to multiple time slots of transmitters so as the transmitter corresponding to the forget command switches from a single channel mode to an all channel mode.

In one embodiment, in order to simplify designs of the transmitter and the touch sensitive processing apparatus, there is a correspondence between a frequency of the electrical signals and a frequency of the one channel, the correspondence and the time slots are predetermined.

In one embodiment, in order to reduce external electromagnetic interferences to the beacon signals for increasing chances of detecting the beacon signals by the transmitter, the beacon signals are modulated as DSSS (direct spread spectrum sequence) codes.

In on embodiment, in order to report a position of transmitter to the host even without being paired with the transmitter, the touch sensitive processing apparatus as claimed further comprises: a host interface, for connecting to the processor and a host, wherein the processor is further configured for: when it is determined that one or more transmitters corresponding one or more the time slots transmit the electrical signals, calculating one or more positions corresponding to the one or more transmitters on the touch panel, respectively; and have the host interface reports the one or more positions corresponding to the one or more transmitters to the host.

According to one aspect of the present invention, an electronic system is provided. The electronic system comprising: one or more the aforementioned touch sensitive processing apparatuses; one or more adjacent touch panels, respectively coupled to the one or more the touch sensitive processing apparatus; and a host, wherein each one of the touch sensitive processing apparatuses further comprises: a host interface, for connecting to the processor of the touch sensitive processing apparatus and the host, wherein the processor of the touch sensitive processing apparatus is further configured for: when it is determined that one or more transmitters corresponding one or more the time slots transmit the electrical signals, calculating one or more positions corresponding to the one or more transmitters on the touch panel, respectively; and have the host interface reports the one or more positions corresponding to the one or more transmitters to the host.

According to one aspect of the present invention, a transmitter processing method is provided. The transmitter processing method comprising: when in an all channel mode, do following steps: receiving beacon signals, transmitted by a touch panel, in multiple channels; and switching from the all channel mode to a single channel mode if the beacon signals are received in one channel of the multiple channels; and when in the single channel mode, do following steps: transmitting electrical signals in a time slot after the beacon signals are received; and receiving the beacon signals only in the one channel of the multiple channels.

In one embodiment, in order to prevent conflict with another stylus with the same time slot setting, in the all channel mode, the transmitter processing method further comprises: when the beacon signals are received, determining whether the beacon signals include information corresponding to the time slot is set; and when the information corresponding to the time slot is not set, performing said switching step.

In one embodiment, in order to let the transmitter to be functioned properly to another touch panel after leaving one touch panel, in the all channel mode, the transmitter processing method further comprises: resetting a counter after said switching step, wherein in the single channel mode, the transmitter processing method further comprises: determining whether the beacon signals in the one channel are received; when the beacon signals are received in the one channel, resetting the counter; when the beacon signals are not received in the one channel, increasing a value of the counter and determining whether the value of the counter is larger than a threshold; and when the value of the counter is larger than the threshold, switching from the single channel mode to the all channel mode.

In one embodiment, in order to change frequency of the electrical frequency by changing frequency of the beacon signals by the touch sensitive processing apparatus, in the single channel mode, the transmitter processing method further comprises: determining whether the beacon signals in the one channel are received; when the beacon signals are received in the one channel, determining whether the beacon signals include a forget command corresponding to the stylus; and when the beacon signals include the forget command, switching from the single channel mode to the all channel mode.

In one embodiment, in order to simplify designs of the transmitter and the touch sensitive processing apparatus, there is a correspondence between a frequency of the electrical signals and a frequency of the one channel, the correspondence and the time slot are predetermined.

In one embodiment, in order to let the transmitter receives the beacon signals and transmits the electrical signal when it is really approximating or touching the touch panel, the transmitter processing method further comprises: receiving the beacon signals and transmitting the electrical signals, respectively, via an electrode in a time-sharing manner.

According to an aspect of the present invention, a processing method applicable to a touch sensitive processing apparatus is provided. The processing method comprising: transmitting beacon signals via multiple touch electrodes of a touch panel, wherein the beacon signals include a data section denoting information corresponding to multiple time slots of transmitters; in each of the time slots after the beacon signals are transmitted, respectively, determining whether a transmitter corresponding the current time slot transmits electrical signals received by the multiple touch electrodes; and updating the data section denoting information corresponding to the multiple time slots according to the determination results in each of the time slots.

In one embodiment, in order to change frequency of the electrical frequency by changing frequency of the beacon signals by the touch sensitive processing apparatus, the processing method further comprises adding a forget command in the data section denoting information corresponding to multiple time slots of transmitters so as the transmitter corresponding to the forget command switches from a single channel mode to an all channel mode.

In one embodiment, in order to simplify designs of the transmitter and the touch sensitive processing apparatus, there is a correspondence between a frequency of the electrical signals and a frequency of the one channel, the correspondence and the multiple time slots are predetermined.

In one embodiment, in order to reduce external electromagnetic interferences to the beacon signals for increasing chances of detecting the beacon signals by the transmitter, the beacon signals are modulated as DSSS (direct spread spectrum sequence) codes.

In one embodiment, in order to report a position of transmitter to the host even without being paired with the transmitter, the processing method further comprises: when it is determined that one or more transmitters corresponding one or more the time slots transmit the electrical signals, calculating one or more positions corresponding to the one or more transmitters on the touch panel, respectively; and reporting the one or more positions corresponding to the one or more transmitters to a host.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A transmitter, comprising:
   a receiving circuit, configured to receive beacon signals;
   a transmitting circuit, configured to transmit electrical signals to a touch panel which emits the beacon signals; and
   a processor,
   wherein when in an all channel mode, the processor is configured for:
   having the receiving circuit receive the beacon signals in multiple channels; and
   switching from the all channel mode to a single channel mode if the receiving circuit receives the beacon signals in one channel of the multiple channels;
   wherein in the all channel mode, the processor is further configured for:
   when the receiving circuit receives the beacon signals, determining whether the beacon signals include information corresponding to the time slot is set; and
   when the information corresponding to the time slot is not set, performing said switching; and
   wherein in the single channel mode, the processor is configured for:
   having the transmitting circuit transmit the electrical signals in a time slot after the beacon signals are received; and
   having the receiving circuit receive the beacon signals only in the one channel of the multiple channels.

2. The transmitter as claimed in claim 1, wherein in the all channel mode, the processor is further configured for:
   resetting a counter after said switching step,
   wherein in the single channel mode, the processor is further configured for:
   determining whether the receiving circuit receives the beacon signals in the one channel;
   when the receiving circuit receives the beacon signals in the one channel, resetting the counter;
   when the receiving circuit does not receive the beacon signals in the one channel, increasing a value of the counter and determining whether the value of the counter is larger than a threshold; and
   when the value of the counter is larger than the threshold, switching from the single channel mode to the all channel mode.

3. The transmitter as claimed in claim 1, wherein in the single channel mode, the processor is further configured for:
   determining whether the receiving circuit receives the beacon signals in the one channel;
   when the receiving circuit receives the beacon signals in the one channel, determining whether the beacon signals include a forget command corresponding to the transmitter; and
   when the beacon signals include the forget command, switching from the single channel mode to the all channel mode.

4. The transmitter as claimed in claim 1, wherein there is a correspondence between a frequency of the electrical signals and a frequency of the one channel, the correspondence and the time slot are predetermined.

5. The transmitter as claimed in claim 1, further comprises:
an electrode; and
a multiplexer, configured for connecting to the receiving circuit and the transmitting circuit in order to receive the beacon signals and to transmit the electrical signals, respectively, in a time-sharing manner.

6. A touch sensitive processing apparatus, comprising:
a driving circuit, configured for transmitting beacon signals via multiple touch electrodes of a touch panel;
a sensing circuit, configured for sensing electrical signals via the multiple touch electrodes; and
a processor, coupled to the driving circuit and the sensing circuit, configured for:
having the driving circuit transmit the beacon signals in one channel, wherein the beacon signals include a data section denoting information corresponding to multiple time slots of transmitters;
in each of the time slots after the beacon signals are transmitted, respectively, determining whether a transmitter corresponding the current time slot transmits the electrical signals received by the multiple touch electrodes; and
updating the data section denoting information corresponding to the multiple time slots according to the determination results in each of the time slots.

7. The touch sensitive processing apparatus as claimed in claim 6, wherein the processor is further configured for adding a forget command in the data section denoting information corresponding to multiple time slots of transmitters so as the transmitter corresponding to the forget command switches from a single channel mode to an all channel mode.

8. The touch sensitive processing apparatus as claimed in claim 6, wherein there is a correspondence between a frequency of the electrical signals and a frequency of the one channel, the correspondence and the multiple time slots are predetermined.

9. The touch sensitive processing apparatus as claimed in claim 6, wherein the beacon signals are modulated as DSSS (direct spread spectrum sequence) codes.

10. The touch sensitive processing apparatus as claimed in claim 6, further comprises:
a host interface, for connecting to the processor and a host,
wherein the processor is further configured for:
when it is determined that one or more transmitters corresponding one or more the time slots transmit the electrical signals, calculating one or more positions corresponding to the one or more transmitters on the touch panel, respectively; and
have the host interface reports the one or more positions corresponding to the one or more transmitters to the host.

11. An electronic system, comprising:
one or more the touch sensitive processing apparatuses as claimed in claim 6;
one or more adjacent touch panels, respectively coupled to the one or more the touch sensitive processing apparatuses; and
a host,
wherein each one of the touch sensitive processing apparatuses further comprises:
a host interface, for connecting to the processor of the touch sensitive processing apparatus and the host,
wherein the processor of the touch sensitive processing apparatus is further configured for:
when it is determined that one or more transmitters corresponding one or more the time slots transmit the electrical signals, calculating one or more positions corresponding to the one or more transmitters on the touch panel, respectively; and
have the host interface reports the one or more positions corresponding to the one or more transmitters to the host.

12. A transmitter processing method, comprising:
when in an all channel mode, do following steps:
receiving beacon signals, transmitted by a touch panel, in multiple channels; and
switching from the all channel mode to a single channel mode if the beacon signals are received in one channel of the multiple channels;
wherein in the all channel mode, the transmitter processing method further comprises:
when the beacon signals are received, determining whether the beacon signals include information corresponding to the time slot is set; and
when the information corresponding to the time slot is not set, performing said switching step; and
when in the single channel mode, do following steps:
transmitting electrical signals in a time slot after the beacon signals are received; and
receiving the beacon signals only in the one channel of the multiple channels.

13. The transmitter processing method as claimed in claim 12, wherein in the all channel mode, the transmitter processing method further comprises:
resetting a counter after said switching step,
wherein in the single channel mode, the transmitter processing method further comprises:
determining whether the beacon signals in the one channel are received;
when the beacon signals are received in the one channel, resetting the counter;
when the beacon signals are not received in the one channel, increasing a value of the counter and determining whether the value of the counter is larger than a threshold; and
when the value of the counter is larger than the threshold, switching from the single channel mode to the all channel mode.

14. The transmitter processing method as claimed in claim 12, wherein in the single channel mode, the transmitter processing method further comprises:
determining whether the beacon signals in the one channel are received;
when the beacon signals are received in the one channel, determining whether the beacon signals include a forget command corresponding to the stylus; and
when the beacon signals include the forget command, switching from the single channel mode to the all channel mode.

15. The transmitter processing method as claimed in claim 12, wherein there is a correspondence between a frequency of the electrical signals and a frequency of the one channel, the correspondence and the time slot are predetermined.

16. The transmitter processing method as claimed in claim 12, further comprises:
receiving the beacon signals and transmitting the electrical signals, respectively, via an electrode in a time-sharing manner.

17. A processing method applicable to a touch sensitive processing apparatus, comprising:

transmitting beacon signals via multiple touch electrodes of a touch panel, wherein the beacon signals include a data section denoting information corresponding to multiple time slots of transmitters;

in each of the time slots after the beacon signals are transmitted, respectively, determining whether a transmitter corresponding the current time slot transmits electrical signals received by the multiple touch electrodes; and updating the data section denoting information corresponding to the multiple time slots according to the determination results in each of the time slots.

18. The processing method as claimed in claim 17, further comprises adding a forget command in the data section denoting information corresponding to multiple time slots of transmitters so as the transmitter corresponding to the forget command switches from a single channel mode to an all channel mode.

19. The processing method as claimed in claim 17, wherein there is a correspondence between a frequency of the electrical signals and a frequency of the one channel, the correspondence and the multiple time slots are predetermined.

20. The processing method as claimed in claim 17, wherein the beacon signals are modulated as DSSS (direct spread spectrum sequence) codes.

21. The processing method as claimed in claim 17, further comprises:

when it is determined that one or more transmitters corresponding one or more the time slots transmit the electrical signals, calculating one or more positions corresponding to the one or more transmitters on the touch panel, respectively; and reporting the one or more positions corresponding to the one or more transmitters to a host.

* * * * *